United States Patent
Mikhaylik et al.

(10) Patent No.: US 6,936,382 B2
(45) Date of Patent: Aug. 30, 2005

(54) LITHIUM BATTERIES

(75) Inventors: Yuriy V. Mikhaylik, Tucson, AZ (US); Terje A. Skotheim, Tucson, AZ (US); Boris A. Trofimov, Irkutsk (RU)

(73) Assignee: Moltech Corporation, Tucson, AZ (US)

( * ) Notice: Subject to any disclaimer, the term of this patent is extended or adjusted under 35 U.S.C. 154(b) by 319 days.

(21) Appl. No.: 10/390,516

(22) Filed: Mar. 17, 2003

(65) Prior Publication Data

US 2003/0180611 A1 Sep. 25, 2003

Related U.S. Application Data

(63) Continuation of application No. 09/709,242, filed on Nov. 10, 2000, now Pat. No. 6,569,573.
(60) Provisional application No. 60/165,368, filed on Nov. 12, 1999.

(51) Int. Cl.[7] .............................................. H01M 10/40
(52) U.S. Cl. ...................... 429/326; 429/200; 429/329; 429/339; 429/340; 429/341; 29/623.1
(58) Field of Search .................................. 429/200, 326, 429/329, 337, 339, 340, 341; 29/623.1

(56) References Cited

U.S. PATENT DOCUMENTS

| | | | | |
|---|---|---|---|---|
| 5,998,065 A | * | 12/1999 | Tsutsumi et al. | 429/326 X |
| 6,174,628 B1 | * | 1/2001 | Umemoto et al. | 429/324 |
| 2004/0202930 A1 | * | 10/2004 | Armand et al. | 429/337 X |

FOREIGN PATENT DOCUMENTS

| | | | | |
|---|---|---|---|---|
| JP | 9-31344 | * | 2/1997 | H01M/10/40 |

* cited by examiner

*Primary Examiner*—Stephen J. Kalafut
(74) *Attorney, Agent, or Firm*—David E. Rogers; Squire, Sanders & Dempsey L.L.P.

(57) ABSTRACT

Provided is a lithium battery in which the cathode comprises an electroactive sulfur-containing material and the electrolyte comprises a lithium salt, a non-aqueous solvent, and one or more capacity-enhancing reactive components. Suitable reactive components include electron transfer mediators. Also are provided methods for making the lithium battery.

16 Claims, No Drawings

LITHIUM BATTERIES

RELATED APPLICATION

This application is a Continuation application of, and claims priority from, U.S. patent application Ser. No. 09/709,242 by Mikhaylik et al., filed Nov. 10, 2000, now U.S. Pat. No. 6,569,573, which claims priority from, U.S. Provisional Patent Application Ser. No. 60/165,368 by Mikhaylik, et al., filed on Nov. 12, 1999. These related applications are incorporated herein by reference.

TECHNICAL FIELD

The present invention relates generally to the field of electrochemical cells. More particularly, this invention pertains to lithium batteries in which the cathode comprises an electroactive sulfur-containing material and the electrolyte comprises reactive components that enhance the capacity of the lithium battery.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the evolution of batteries continues, and particularly as lithium batteries become more widely accepted for a variety of uses, the need for safe, long lasting high energy batteries becomes more important. There has been considerable interest in recent years in developing high energy density cathode-active materials for use in high energy primary and secondary batteries with lithium containing anodes. Various types of cathode materials for the manufacture of lithium batteries are known in the art.

One class of lithium batteries known in the art are rechargeable lithium batteries where the battery is able to undergo multiple discharge and recharge cycles. During discharge of a lithium cell, lithium ions are formed and extracted from the anode and inserted into the cathode. On recharge, the reverse process occurs. The electrodes used in these batteries can have a dramatic effect on the performance of the battery and, in particular, on cycle life.

Another class of lithium batteries known in the art are primary lithium batteries. A primary battery differs from a rechargeable battery in that it is only designed to be discharged once. In fact, because of the design, attempts to recharge a primary battery may create safety problems and may be only partially effective for a very limited number of cycles. Examples of lithium primary cells are described by Nishio et al. in *Handbook of Battery Materials*, Chapter 2, "Practical Batteries", pp. 31–40, Elsevier, Amsterdam, (1999) and by Linden in *Handbook of Batteries*, Chapter 14, pp. 5–6, McGraw-Hill, New York (1995). Primary, non-rechargeable cells, with their single discharge, have a short lifetime and their disposal burden is high, which makes the choice of the cathode material and its impact on the environment of great importance. Sulfur is an attractive cathode-active material for primary cells, both from an environmental perspective and from its very high theoretical specific capacity of 1675 mAh/g in the lithium-sulfur couple.

U.S. Pat. No. 4,410,609 to Peled et al. describes a primary cell comprising an anode consisting of lithium or a dischargeable alloy of lithium, an electrolyte comprising a solvent to dissolve both an electrolyte salt and polysulfides at a low concentration, and an inert porous cathode current collector, which may be loaded with sulfur. Yamin et al., in *Electrochemical Society Proceedings*, 1984, Volume 84-1, 301–310, describe low rate lithium/sulfur batteries in which the primary cells have a porous carbon cathode current collector impregnated with sulfur and in which the cell's electrolyte is a lithium polysulfide saturated solution of 1M $LiClO_4$ in tetrahydrofuran-toluene mixtures. The room temperature energy density for these cells is reported to be 730 Wh/Kg.

In a study of dioxolane-based solvents for lithium-sulfur batteries, Peled et al., in *J. Electrochem. Soc.*, 1989, 136, 1621–1625, report that dioxolane-rich solvents are compatible with lithium but that sulfur utilization is only 50% due to the final reduction (discharge) product, $Li_2S_2$.

There is a need to enhance the performance of primary and rechargeable lithium electrochemical cells. In studies on lithium/thionyl chloride cells, performance enhancement has been achieved by the addition of halide additives. For example, Linden, in *Handbook of Batteries*, Chapter 14, pp. 44–47, McGraw-Hill, New York (1995), summarizes data showing an increase in cell voltage and energy density by the addition of BrCl to lithium/thionyl chloride cells. In U.S. Pat. Nos. 4,784,925 and 4,784,927 to Klinedinst et al., small quantities of iodine or iodine monochloride are reported to act as catalysts to increase output voltage and output capacity of lithium/thionyl chloride cells.

Sodium-sulfur cells, which typically operate at high temperatures, such as 300° C. to 350° C., also typically operate at a capacity less than theoretical to avoid precipitation of insoluble $Na_2S$ and $Na_2S_2$. U.S. Pat. No. 4,018,969 to Fisher et al., and U.S. Pat. Nos. 4,184,013, 4,216,276, and 4,238,553 to Weddigen et al. describe additives which increase the solubility of $Na_2S$ and $Na_2S_2$ in the liquid sulfur cathode and thereby increase the capacity of high temperature sodium-sulfur cells.

Despite the various approaches proposed for the fabrication of lithium cells, there remains a need for higher energy density and safer and more environmentally acceptable primary and rechargeable lithium cells.

It is, therefore, an object of the present invention to provide lithium cells which have higher energy density.

It is another object of the present invention to provide cells which are safe and which comprise environmentally acceptable materials.

SUMMARY OF THE INVENTION

The present invention pertains to a lithium electrochemical cell comprising: (a) a solid lithium anode; (b) a solid cathode comprising an electroactive sulfur-containing material; and (c) a non-aqueous electrolyte interposed between the solid anode and the solid cathode, which electrolyte comprises: (i) one or more lithium salts; (ii) one or more non-aqueous solvents; and (iii) one or more capacity-enhancing reactive components.

In one embodiment, the one or more capacity-enhancing reactive components comprise an anion receptor. In one embodiment, the one or more capacity-enhancing reactive components comprise an electron transfer mediator.

In one embodiment, the anion receptor comprises a polyalkyleneamine compound of the formula (—N(R)—$CH_2$—$CH_2$—)$_q$, where q is an integer equal to or greater than 2, and R is a substituent selected from the group consisting of $CF_3SO_2$, $CF_3CO$, CN, $SO_2CN$, and (—$CH_2$—$CH_2$—N $(R^1)—)_p$, where $R^1$ is selected from the group consisting of H, $CF_3SO_2$, $CF_3CO$, CN, and $SO_2CN$, and p is an integer from 1 to 4.

In one embodiment, the anion receptor is a boron moiety, $BX_3$, where X, is the same or different at each occurrence and is an electron withdrawing moiety selected from the group consisting of F, perfluoroalkyl, $CF_2=CF—$, pentafluorophenyl, 3,4,5-trifluorophenyl, $CF_3SO_2$, $N(CF_3SO_2)_2$, $C(CF_3SO_2)_3$, and

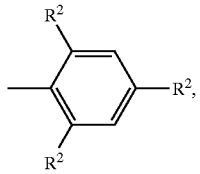

where $R^2$ is the same or different at each occurrence and is selected from the group consisting of H, F, $CF_3$, $COCF_3$, $SO_2CF_3$, and $SO_2F$.

In one embodiment, the anion receptor is present in the amount of 0.2% to 25% by weight of the electrolyte. In one embodiment, the anion receptor is present in the amount of 0.5% to 10% by weight of the electrolyte.

In one embodiment, the capacity-enhancing reactive component comprises components of formula:

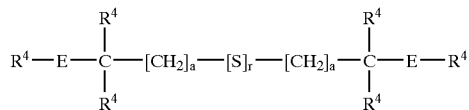

wherein:
$R^4$ is the same or different at each occurrence and is selected from the group consisting of H, alkyl, alkenyl, aryl, or substituted derivatives thereof;
E is the same or different at each occurrence and is selected from the group consisting of O, $NR^5$, and S, where $R^5$ is alkyl, aryl, or substituted derivatives thereof;
a is an integer from 0 to 1; and
r is an integer from 2 to 5.

In one embodiment, the electron transfer mediator is of the formula:

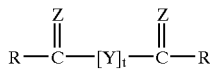

wherein:
Z is the same or different at each occurrence and is selected from the group consisting of O, S, Se, and $NR^5$, where $R^5$ is alkyl, aryl, or substituted derivatives thereof;
R is the same or different at each occurrence, is selected from the group consisting of alkyl, aryl, F, Cl, $CF_3$, $CF_3SO_2$, and $N(R^5)_2$, where $R^5$ is alkyl, aryl, or substituted derivatives thereof;
Y is —C=C— or

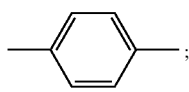

and
t is an integer from 0 to 4.

In another embodiment, the electron transfer mediator is of the formula:

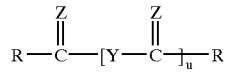

wherein:
Z is the same or different at each occurrence and is selected from the group consisting of O, S, Se, and $NR^5$, where $R^5$ is alkyl, aryl, or substituted derivatives thereof;
R is the same or different at each occurrence and is selected from the group consisting of alkyl, aryl, F, Cl, $CF_3$, $CF_3SO_2$, and $N(R^6)_2$, where $R^6$ is alkyl, aryl, or substituted derivatives thereof;
Y is —C=C— or

and
u is an integer from 1 to 6.

In one embodiment, the electron transfer mediator is present in the amount of 0.2% to 25% by weight of the electrolyte. In one embodiment, the electron transfer mediator is present in the amount of 0.5% to 10% by weight of the electrolyte.

In one embodiment, the electron transfer mediator has an oxidation-reduction potential less than 2.2 V. In a preferred embodiment, the electron transfer mediator has an oxidation-reduction potential in the range of 1.5 V to about 2.0 V.

In one embodiment, the one or more non-aqueous solvents are selected from the group consisting of ethers, cyclic ethers, polyethers, sulfones, and sulfolanes.

In one embodiment, the one or more lithium salts are selected from the group consisting of LiBr, LiI, LiSCN, $LiBF_4$, $LiPF_6$, $LiAsF_6$, $LiSO_3CF_3$, $LiN(SO_2CF_3)_2$, $LiC(SO_2CF_3)_3$, $(LiS_x)_zR$, and $Li_2S_x$, where x is an integer from 1 to 20, z is an integer from 1 to 3, and R is an organic group.

In one embodiment, the electroactive sulfur-containing material comprises elemental sulfur. In one embodiment, the electroactive sulfur-containing material, in its oxidized state, comprises one or more polysulfide moieties, $—S_m—$, where m is an integer equal to or greater than 3. In one embodiment, the electroactive sulfur-containing material, in its oxidized state, comprises one or more polysulfide moieties, $—S_m^-$, where m is an integer equal to or greater than 3. In one embodiment, the electroactive sulfur-containing material, in its oxidized state, comprises one or more polysulfide moieties, $S_m^{2-}$, where m is an integer equal to or greater than 3.

In one embodiment, the electroactive sulfur-containing material, in its oxidized state, is of the general formula:

wherein x ranges from greater than 2.5 to about 50, and n is an integer equal to or greater than to 2.

In one embodiment, the electroactive sulfur-containing material, in its oxidized state, comprises one or more of the polysulfur moieties:

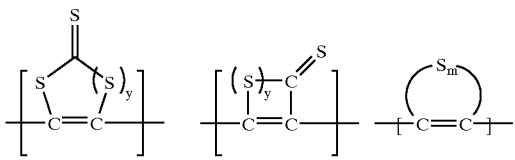

wherein m, the same or different at each occurrence, is an integer and is greater than 2, and y, the same or different at each occurrence, is an integer and is equal to or greater than 1.

In one embodiment, the electroactive sulfur-containing material, in its oxidized state, comprises one or more of the moieties:

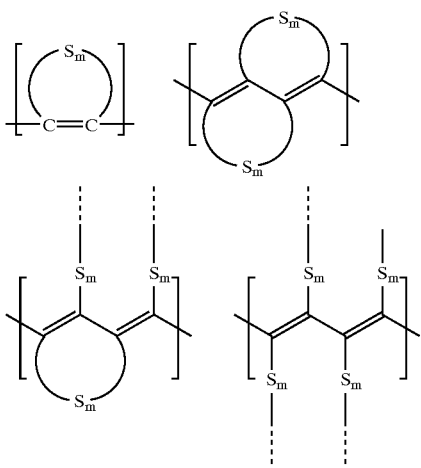

wherein m is the same or different at each occurrence and is greater than 2.

In one embodiment, the electroactive sulfur-containing material is a polymer comprising polymeric segments of the formula;

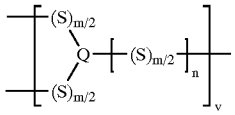

wherein:

Q denotes a carbocyclic repeat unit comprising a carbocycle having from 3 to 12 ring carbon atoms;

S denotes a sulfur atom;

m is the number of sulfur atoms in a given polysulfide linkage, is an integer from 3 to 10, and is the same or different at each occurrence;

n denotes the number of crosslinking polysulfide linkages, is an integer from 1 to 20, and is the same or different at each occurrence; and v is an integer greater than 1.

In one embodiment, the electroactive sulfur-containing material comprises greater than 50% by weight of sulfur. In a preferred embodiment, the electroactive sulfur-containing material comprises greater than 75% by weight of sulfur. In a more preferred embodiment, the electroactive sulfur-containing material comprises greater than 90% by weight of sulfur.

In one embodiment, the lithium anode is selected from the group consisting of lithium metal, lithium-aluminum alloys, lithium-tin alloys, lithium-intercalated carbons, and lithium-intercalated graphites.

In one embodiment, the cell has an energy density of greater than 1000 Wh/Kg. In one embodiment, the cell has an energy density of greater than 1200 Wh/Kg. In one embodiment, the cell has an energy density greater than 1500 Wh/Kg.

In one embodiment of the present invention, the capacity-enhancing reactive components increase the discharge capacity of the first charge-discharge cycle of the cell by greater than 10%. In one embodiment of the present invention, the capacity-enhancing reactive components increase the total discharge capacities of 30 charge-discharge cycles of the cell by greater than 10%. In one embodiment, the capacity-enhancing reactive components increase the total discharge capacities of 30 charge-discharge cycles of the cell by greater than 30%.

In one embodiment, the cell is a secondary electrochemical cell. In one embodiment, the cell is a primary electrochemical cell.

Another aspect of the present invention pertains to a method of making a lithium electrochemical cell comprising the steps of: (a) providing a solid lithium anode; (b) providing a solid cathode comprising an electroactive sulfur-containing material; and (c) interposing a non-aqueous electrolyte between the anode and the cathode, wherein the electrolyte comprises: (i) one or more lithium salts; (ii) one or more non-aqueous solvents; and (iii) one or more capacity-enhancing reactive components, as described herein.

As will be appreciated by one of skill in the art, features of one aspect or embodiment of the invention are also applicable to other aspects or embodiments of the invention.

DETAILED DESCRIPTION OF THE INVENTION

One aspect of the present invention pertains to electrochemical cells comprising: (a) a solid lithium anode; (b) a solid cathode comprising an electroactive sulfur-containing material; and (c) a non-aqueous electrolyte interposed between the anode and the cathode, wherein the electrolyte comprises: (i) one or more lithium salts; (ii) one or more non-aqueous solvents; and (iii) one or more capacity-enhancing reactive components. In one embodiment, the one or more capacity-enhancing reactive components comprise an anion receptor. In one embodiment, the one or more capacity-enhancing reactive components comprise an electron transfer mediator. The capacity-enhancing reactive components may be non-electroactive or electroactive. The term "non-electroactive," as used herein, pertains to a cell component material which does not take part in the electrochemical reaction of discharge in the absence of an electroactive sulfur-containing cathode material.

Capacity-enhancing Electrolyte Reactive Components

In the present invention, capacity-enhancing reactive components are added to the non-aqueous electrolyte of a lithium/electroactive sulfur-containing material electrochemical cell to increase the electrochemical capacity of the cell. For an electrochemical cell based on lithium and elemental sulfur, the theoretical energy density is 2,600 Wh/Kg. In one example, the capacity limit for a lithium/elemental sulfur cell is about 730 Wh/Kg (calculated on the basis of all cell components, excluding the case) as reported by Yamin et al. in *Electrochemical Society Proceedings,* 1984, Volume 84-1, 301–310. Typically, the capacity is limited by the insolubility and electronic non-conductivity of $Li_2S_2$, a reduction product of the cell, which prevents the complete reduction of $S_8$ to $Li_2S$. It can be seen that approximately 50% of the theoretical capacity is lost if the electrochemical reaction stops at $Li_2S_2$. In other words, to extract maximum capacity from the cell, $Li_2S_2$ must be reduced to $Li_2S$.

One route by which the capacity-enhancing reactive components of the present invention enhance the capture of the theoretical capacity of the lithium/sulfur-type cells of the present invention is by increasing the solubility of $Li_2S_2$. The solubility of $Li_2S_2$ may be increased by the use of anion receptors to react or complex with the $Li_2S_2$ produced during discharge. Suitable anion receptors include, but are not limited to, the ammonium, amide and Lewis acid materials described by Dietrich in *Pure and Applied Chemistry*, 1993, 65, 1457–1464, such as polyammonium macrocycles, polyammonium macrobicycles, polyammonium macrotricycles, guanidinium materials, amide functional molecules, and Lewis acid materials. Lee et al. in U.S. Pat. Nos. 5,705,689 and 5,789,585 describe polyalkyleneamine derivatives as anion receptors which increase the ionic conductivity of solutions of lithium salts in non-aqueous solvents, for example, LiCl and LiBr in tetrahydrofuran. Lee et al. in *J. Electrochem. Soc.*, 1998, 145, 2813–2818, describe borate ester anion receptors which increase the ionic conductivity of solutions of lithium salts, for example, lithium trifluoroacetate, LiF, LiCl, and LiI, in dimethoxyethane.

Suitable capacity-enhancing reactive components of the present invention for use as anion receptors include, but are not limited to, linear, branched, and cyclic polyalkyleneamines, of the formula $(—N(R)—CH_2—CH_2—)_q$, where R is a moiety selected from the group of electron withdrawing groups, such as, $CF_3SO_2$, $CF_3CO$, CN, $SO_2CN$, and q is an integer from 1 to 20; or R is $(—CH_2—CH_2—N(R^1)—)_p$, where $R^1$ is H, $CF_3SO_2$, $CF_3CO$, CN, and $SO_2CN$, and p is an integer from 1 to 4, as described, for example, by Lee et al. in U.S. Pat. Nos. 5,705,689 and 5,789,585. Further suitable capacity-enhancing reactive components for use as anion receptors include compositions with $NCF_3$, $NSO_2F$, $NSO_2CF_3$, and $NCF_2N$ functionality, as described, for example, in U.S. Pat. No. 4,216,276 to Weddigen et al.

Suitable Lewis acid anion receptors include, but are not limited to, boron, tin, and silicon moieties. For example, boron moieties, $BX_3$, where X, is the same or different at each occurrence and is an electron withdrawing moiety selected from the group consisting of F, perfluoroalkyl, $CF_2=CF—$, pentafluorophenyl, 3,4,5-trifluorophenyl, $CF_3SO_2$, $N(CF_3SO_2)_2$, $C(CF_3SO_2)_3$, and

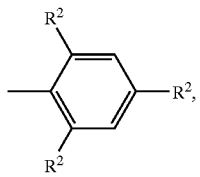

where $R^2$ is the same or different at each occurrence, and is selected from the group consisting of H, F, $CF_3$, $COCF_3$, $SO_2CF_3$, and $SO_2F$.

The amount of the anion receptor may vary over a wide range from about 0.2% by weight of the total electrolyte components to about 25% by weight Preferably the amount is from about 0.5% by weight to about 10% by weight. More preferably the amount is from about 1% by weight to about 5% by weight.

Although any of the suitable anion receptors may be used, in each situation the most effective choice will depend on the particular electrolyte solvent system and electrolyte salt.

An alternative route to enhance the capture of the theoretical capacity of the lithium/sulfur-type cells of the present invention is by the addition of an electron transfer mediator to the electrolyte for the reduction of $Li_2S_2$ to $Li_2S$. Effective mediators are those whose oxidation-reduction potential is below 2.2 V. Most preferably, the mediators have an oxidation-reduction potential in the range of 1.5 V to 2.0 V.

While not wishing to be bound by any theory, the electron transfer mediators may function by accepting a pair of electrons in an electrochemical reduction process at a voltage in the range of 1.5 V to 2.0 V, and in turn transferring the electrons to $Li_2S_2$ with the formation of lithium sulfide, $Li_2S$, liberation of sulfide ion, $S^{2-}$, and regeneration of the mediator, M. The process may described as:

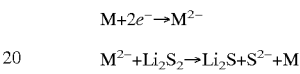

$$M^{2-} + Li_2S_2 \rightarrow Li_2S + S^{2-} + M$$

Alternatively, the electron transfer mediators may function by accepting a single electron in an electrochemical reduction process at a voltage in the range of 1.5 V to 2.0 V and in turn transferring an electron to $Li_2S_2$. In a subsequent step, a second electron transfer may take place completing the reduction of $Li_2S_2$ to $Li_2S + S^{2-}$. The mediator remains unchanged in this cycle. This process may be described as:

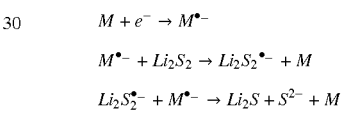

where M represents an electron transfer mediator.

Suitable electron transfer mediators include, but are not limited to, those of formula I:

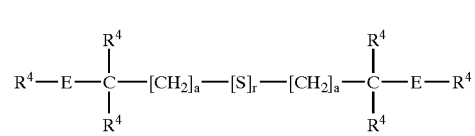

wherein:

$R^4$ is the same or different at each occurrence and is selected from the group consisting of H, alkyl, alkenyl, aryl, or substituted derivatives thereof;

E is the same or different at each occurrence and is selected from the group consisting of O, $NR^5$, and S, where $R^5$ is alkyl, aryl, or substituted derivatives thereof;

a is an integer from 0 to 1; and r is an integer from 2 to 5.

Suitable electron transfer mediators of formula I include, but are not limited to, bis(methoxymethyl)disulfide, bis(methoxymethyl)trisulfide, bis(methoxymethyl)polysulfide, bis(methoxyethyl)disulfide, bis(methoxyethyl)trisulfide, bis(methoxyethyl)polysulfide, bis(3-allyloxy-2-hydroxypropyl)disulfide, bis(3-allyloxy-2-hydroxypropyl)trisulfide, bis(3-allyloxy-2-hydroxypropyl)tetrasulfide, bis(vinyloxyethoxy-2-hydroxypropyl)disulfide, bis(vinyloxyethoxy-2-hydroxypropyl)trisulfide, bis(vinyloxyethoxy-2-hydroxypropyl)polysulfide, bis(2-hydroxy-2-phenylethyl)disulfide, bis(2-hydroxy-2-phenylethyl)trisulfide, bis(2-hydroxy-2-phenylethyl)polysulfide, bis(N,N-dimethylaminoethyl)disulfide, bis(N, N-diethylaminoethyl)disulfide, bis(N,N-dimethylaminoethyl)trisulfide, bis(N,N-diethylaninoethyl)trisulfide, and bis(N,N-dimethylaminoethyl)polysulfide.

Suitable electron transfer mediators also include, but are not limited to, those of formula II:

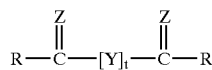

wherein:

Z is the same or different at each occurrence and is selected from the group consisting of O, S, Se, and $NR^5$, where $R^5$ is alkyl, aryl, or substituted derivatives thereof;

R is same or different at each occurrence and is selected from the group consisting of alkyl, aryl, F, Cl, $CF_3$, $CF_3SO_2$, and $N(R^5)_2$, where $R^5$ is alkyl, aryl, or substituted derivatives thereof and is the same or different at each occurrence;

Y is —C=C— or

and t is an integer from 0 to 4.

Suitable electron transfer mediators also include, but are not limited to, those of formula III:

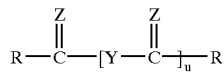

wherein:

Z is the same or different at each occurrence and is selected from the group consisting of O, S, Se, and $NR^5$, where $R^5$ is alkyl, aryl, or substituted derivatives thereof;

R is the same or different at each occurrence and is selected from the group consisting of alkyl, aryl, F, Cl, $CF_3$, $CF_3SO_2$, and $N(R^5)_2$, where $R^5$ is alkyl, aryl, or substituted derivatives thereof and is the same or different at each occurrence;

Y is —C=C— or

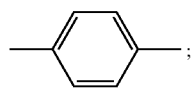

and u is an integer from 1 to 6.

Other examples of suitable electron transfer mediators include transition metal complexes, including but not limited to, complexes of phthalocyanines and porphyrins with transition metals, including but not limited to, iron, cobalt, manganese, vanadium, copper, chromium, and nickel, where the complexes are soluble in the electrolyte.

Other examples of suitable electron transfer mediators include bis-pyridinium salts, also known as viologens, and polynuclear aromatic hydrocarbons which can form radical anions upon reduction, where the bis-pyridinium salts and the polynuclear aromatic hydrocarbons are soluble in the electrolyte.

Although any of the suitable electron transfer mediators may be used, in each situation the most effective choice will depend on the solubility and compatibility of the electron transfer mediator with the particular electrolyte solvent system, the electrolyte salt, and the reduction products of the sulfur-containing cathode material.

The amount of the electron transfer mediator may vary over a wide range from 0.2% by weight of the total electrolyte components to about 25% by weight. Preferably the amount is from about 0.5% by weight to about 10% by weight. More preferably the amount is from about 1% by weight to about 5% by weight In another embodiment of the present invention, an electron transfer mediator may be formed in the electrochemical cell from the reaction of reduction products of the sulfur-containing cathode materials with a precursor moiety. Suitable precursor moieties will possess high reactivity toward cathode reduction products such as, for example, polysulfide anions but be unreactive or possess low reactivity toward electrolyte components. Examples of suitable precursor moieties include, but are not limited to, haloalkyl ethers, haloalkyl amines, alkyl epoxides, aryl epoxides, and glycidyl ethers. Haloalkyl ethers include chloromethyl methyl ether, chloromethyl ethyl ether, chloromethyl benzyl ether, chloroethyl methyl ether, bis(chloromethyl) ether, and the corresponding bromo-derivatives. Haloalkyl amines include N,N-dimethyl-2-chloroethylamine, N,N-diethyl-2-chloroethylamine, and N,N-dimethyl-2-bromoethylamine. Epoxides include propylene oxide, butylene oxide, and styrene oxide. Glycidyl ethers include methyl glycidyl ether, ethyl glycidyl ether, and ethylene glycol methyl glycidyl ether.

The capacity-enhancing reactive components of the present invention are added to the electrolyte, which comprises one or more non-aqueous solvents and one or more ionic electrolyte salts.

In one embodiment of the present invention, the energy density of the cell is greater than 1000 Wh/Kg. In another embodiment, the energy density of the cell is greater than 1200 Wh/Kg. In a preferred embodiment, the energy density of the cell is greater than 1500 Wh/Kg. The term "energy density," as used herein, relates to cell energy based on the sum of the weights of the anode active components, the cathode active components, and the capacity-enhancing reactive components.

In one embodiment of the present invention, the capacity-enhancing reactive components increase the discharge capacity of the first charge-discharge cycle of the cell by greater than 10%. In one embodiment of the present invention, the capacity-enhancing reactive components increase the total discharge capacities of 30 charge-discharge cycles of the cell by greater than 10%. In a preferred embodiment of the present invention, the capacity-enhancing reactive components increase the total discharge capacities of 30 charge-discharge cycles of the cell by greater than 30%.

The electrolytes of the electrochemical cells of the present invention comprising one or more capacity-enhancing reactive components may additionally comprise voltage-enhancing reactive components, for example as described in co-pending U.S. patent application Ser. No. 09/709,778, now abandoned, and published as International Publication No. WO 01/35475, entitled "Lithium Primary Batteries" to Mikhaylik et al. of the common assignee, filed on even date herewith.

Cathodes

The term "electroactive sulfur-containing material," as used herein, relates to cathode active materials which comprise the element sulfur in any form, wherein the electrochemical activity involves the breaking or forming of sulfur-sulfur covalent bonds.

Examples of suitable electroactive sulfur-containing materials, include, but are not limited to, elemental sulfur and organic materials comprising both sulfur atoms and carbon atoms, which may or may not be polymeric. Suitable organic materials include those further comprising heteroatoms, conductive polymer segments, composites, and conductive polymers.

In one embodiment, the electroactive sulfur-containing material comprises elemental sulfur. In one embodiment, the electroactive sulfur-containing material comprises a mixture of elemental sulfur and a sulfur-containing polymer.

In one embodiment, the sulfur-containing material, in its oxidized state, comprises a polysulfide moiety, $S_m$, selected from the group consisting of covalent —$S_m$— moieties, ionic —$S_m^-$ moieties, and ionic $S_m^{2-}$ moieties, wherein m is an integer equal to or greater than 3, such as for example, elemental sulfur and sulfur-containing polymers. In one embodiment, m of the polysulfide moiety, $S_m$, is an integer equal to or greater than 6. In one embodiment, m of the polysulfide moiety, $S_m$, is an integer equal to or greater than 8. In one embodiment, the sulfur-containing material is a sulfur-containing polymer. In one embodiment, the sulfur-containing polymer has a polymer backbone chain and the polysulfide moiety, $S_m$, is covalently bonded by one or both of its terminal sulfur atoms as a side group to the polymer backbone chain. In one embodiment, the sulfur-containing polymer has a polymer backbone chain and the polysulfide moiety, $S_m$, is incorporated into the polymer backbone chain by covalent bonding of the terminal sulfur atoms of the polysulfide moiety.

The specific capacity (mAh/g or Ah/Kg) or energy density (Wh/Kg) in electroactive sulfur-containing materials is directly related to the number of electrons participating in the reduction/oxidation (discharge/charge) process. For a disulfide group, (R'—S—S—R", where R' and R" are independently an organic group), two electrons participate in the discharge/charge process. For higher polysulfides, two electrons participate in each sulfur-sulfur bond reduction. It can be readily appreciated that increased energy densities are obtained in higher polysulfides compared with disulfides.

In one embodiment, the electroactive sulfur-containing material comprises greater than 50% by weight of sulfur. In a preferred embodiment, the electroactive sulfur-containing material comprises greater than 75% by weight of sulfur. In a more preferred embodiment, the electroactive sulfur-containing material comprises greater than 90% by weight of sulfur.

The nature of the electroactive sulfur-containing materials useful in the practice of this invention may vary widely. Further examples of suitable electroactive sulfur-containing materials include, but are not limited to:

(a) an electroactive polycarbon-sulfide material, which in its oxidized state, is of the general formula:

wherein x ranges from greater than 2.5 to about 50, and n is an integer equal to or greater than 2, as described in U.S. Pat. Nos. 5,601,947 and 5,690,702 to Skotheim et al.; and which, in its oxidized state, may comprise one or more of the polysulfur moieties:

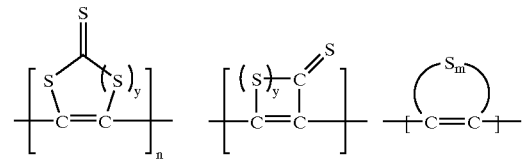

wherein m, the same or different at each occurrence, is an integer and is greater than 2, and y, the same or different at each occurrence, is an integer and is equal to or greater than 1;

(b) an electroactive polyacetylene co-polysulfur material, which, in its oxidized state, is of the general formula:

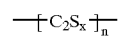

wherein x ranges from greater than 1 to about 100, and n is an integer equal to or greater than 2, as described in U.S. Pat. Nos. 5,529,860 and 6,117,590 to Skotheim et al., and which, in its oxidized state, may comprise one or more of the moieties:

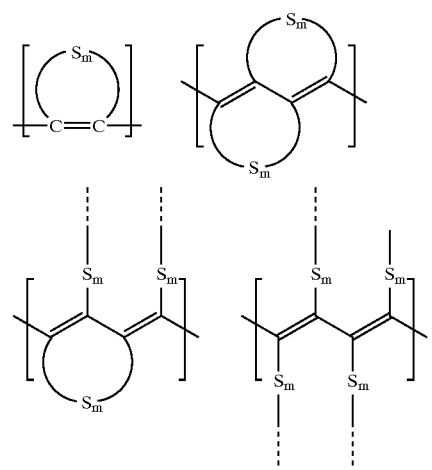

wherein m, the same or different at each occurrence, is greater than 2; and (c) an electroactive, highly crosslinked organic polymer, which polymer comprises polymeric segments of the formula;

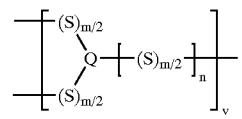

wherein:

Q denotes a carbocyclic repeat unit comprising a carbocycle having from to 12 ring carbon atoms;

S denotes a sulfur atom;

m is the number of sulfur atoms in a given polysulfide linkage, is an integer from 3 to 10, and is the same or different at each occurrence;

n denotes the number of crosslinking polysulfide linkages, is an integer from 1 to 20, and is the same or different at each occurrence; and v is an integer greater than 1; as described in U.S. patent application Ser. No. 08/995,112, now U.S. Pat. No. 6,201, 100, to Gorkovenko et al. of the common assignee and PCT Publication No. WO 99/33130.

Other suitable electroactive sulfur-containing materials comprising polysulfide linkages include, but are not limited to, those described in U.S. Pat. No. 4,664,991 to Perichaud et al. and in U.S. Pat. Nos. 5,723,230, 5,783,330, 5,792,575 and 5,882,819 to Naoi et al.

Other examples of suitable electroactive sulfur-containing polymers include organo-sulfur materials comprising disulfide linkages, although their low specific capacity compared to the corresponding materials comprising polysulfide linkages makes it highly difficult to achieve the high capacities desired for practical electrochemical cells. However, they may be utilized in a blend with elemental sulfur and/or with sulfur-containing polymers comprising a polysulfide moiety in the cathodes of this invention, and may contribute by their electrochemical properties, by their interaction with lithium polysulfides and lithium sulfides generated during the cycling of the cells, and, optionally, by their melting properties during cell fabrication, to achieve the desired high capacities in the electrochemical cells or batteries of the present invention. Examples of electroactive sulfur-containing materials comprising disulfide groups include those described in U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

The cathodes of the lithium cells of the present invention may further comprise one or more conductive fillers to provide enhanced electronic conductivity. Examples of conductive fillers include, but are not limited to, those selected from the group consisting of conductive carbons, graphites, activated carbon fibers, non-activated carbon nanofibers, metal flakes, metal powders, metal fibers, carbon fabrics, metal mesh, and electrically conductive polymers. The amount of conductive filler, if present, is preferably in the range of 2 to 30% by weight. The cathodes of the present invention may also further comprise other additives such as, for example, metal oxides, aluminas, silicas, and transition metal chalcogenides.

The cathodes of the lithium cells of the present invention may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, those selected from the group consisting of polytetrafluoroethylenes (Teflon®), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. The amount of binder, if present, is preferably in the range of 2 to 30% by weight.

The cathodes of the lithium cells of the present invention may further comprise a current collector as known in the art. Current collectors are useful in efficiently collecting the electrical current generated throughout the cathode and in providing an efficient surface for attachment of the electrical contacts leading to the external circuit as well as functioning as a support for the cathode. Examples of useful current collectors include, but are not limited to, those selected from the group consisting of metallized plastic films, metal foils, metal grids, expanded metal grids, metal mesh, metal wool, woven carbon fabric, woven carbon mesh, non-woven carbon mesh, and carbon felt.

Cathodes of the lithium cells of the present invention may be prepared by a variety of methods. For example, one suitable method comprises the steps of: (a) dispersing or suspending in a liquid medium the electroactive sulfur-containing material, as described herein; (b) optionally adding to the mixture of step (a) a conductive filler, binder, or other cathode additives; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode.

Examples of suitable liquid media for the preparation of cathodes of the present invention include aqueous liquids, non-aqueous liquids, and mixtures thereof. Especially preferred liquids are non-aqueous liquids such as, for example, methanol, ethanol, isopropanol, propanol, butanol, tetrahydrofuran, dimethoxyethane, acetone, toluene, xylene, acetonitrile, and cyclohexane.

Mixing of the various components can be accomplished using any of a variety of methods known in the art so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to substrates by any of a variety of coating methods known in the art and then dried using techniques, known in the art, to form the solid cathodes of the lithium cells of this invention. Suitable hand coating techniques include, but are not limited to, the use of a wire-wound coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of means known in the art. Examples of suitable methods for the removal of liquids from the mixture include, but are not limited to, hot air convection, heat, infrared radiation, flowing gases, vacuum, reduced pressure, and by simply air drying.

The method of preparing the cathodes of the present invention may further comprise heating the electroactive sulfur-containing material to a temperature above its melting point and then resolidifying the melted electroactive sulfur-containing material to form a cathode active layer having redistributed sulfur-containing material of higher volumetric density than before the melting process.

Electrolytes, Separators, and Electrochemical Cells.

The electrolytes used in electrochemical or battery cells function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more non-aqueous liquid electrolyte solvents, gel polymer materials, or polymer materials. Suitable non-aqueous electrolytes for use in the present invention include, but are not limited to, organic electrolytes comprising one or more materials selected from the group consisting of liquid electrolytes, gel polymer electrolytes, and solid polymer electrolytes. Examples of non-aqueous electrolytes for lithium batteries are described by Dominey in *Lithium Batteries, New Materials, Developments and Perspectives*, Chapter 4, pp. 137–165, Elsevier, Amsterdam (1994). Examples of gel polymer electrolytes and solid polymer electrolytes are described by Alamgir et al. in *Lithium Batteries, New Materials, Developments and Perspectives*, Chapter 3, pp. 93–136, Elsevier, Amsterdam (1994).

Examples of useful non-aqueous liquid electrolyte solvents include, but are not limited to, non-aqueous organic solvents, such as, for example, N-methyl acetamide, acetonitrile, acetals, ketals, sulfones, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful.

Examples of ethers include, but are not limited to, dimethyl ether, diethyl ether, methylethyl ether, dipropyl ether, diisopropyl ether, dibutyl ether, dimethoxymethane, trimethoxymethane, dimethoxyethane, diethoxyethane, 1,3-dimethoxypropane, tetrahydrofuran, tetrahydropyran, 1,4-dioxane, and 1,3-dioxolane.

Examples of polyethers include, but are not limited to, diethylene glycol dimethyl ether (diglyme), triethylene glycol dimethyl ether (triglyme), higher glymes, diethylene glycol divinylether, and triethylene glycol divinylether.

Examples of sulfones include, but are not limited to, sulfolane, 3-methyl sulfolane, 3-sulfolene, and non-symmetrical, non-cyclic sulfones, and fluorinated or partially fluorinated derivatives of the foregoing.

The specific choice of solvent will depend on several factors including self discharge. The term "self discharge," as used herein, relates to the loss of capacity, or charge, when no external load is applied to the cell. An electrolyte comprising one or more non-aqueous electrolyte solvents and one or more electrolyte salts typically interacts with the lithium anode surface to form a solid electrolyte interface (SEI). The SEI allows passage of lithium ions as the cell discharges and at the same time it is desirable that the SEI protects the lithium surface from further reactions with electrolyte, cathode discharge products, or other soluble components of the cathode. In cells comprising electroactive sulfur-containing materials, the SEI should protect the lithium from self discharge, for example, from reaction with possible cathode discharge products such as sulfide ions, polysulfide ions, and other sulfur containing ions, and soluble cathode components such as sulfur. Preferred electrolyte solvents are those which provide low self discharge rates.

These liquid electrolyte solvents are themselves useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to solvents, gelling agents, and polymers as known in the art for forming non-aqueous electrolytes, the non-aqueous electrolyte may further comprise one or more ionic electrolyte salts, also as known in the art, to increase the ionic conductivity.

Examples of ionic electrolyte salts for use in the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts useful in the practice of this invention include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. The lithium polysulfides. Li$_2$S$_x$, may be formed in situ in Li/S cells by self-discharge of the cells or during the discharge of the cells. Preferred ionic electrolyte salts are LiBr, LiI, LiSCN, LiBF$_4$, LiPF$_6$, LiAsF$_6$, LiSO$_3$CF$_3$, LiN(SO$_2$CF$_3$)$_2$, and LiC (SO$_2$CF$_3$)$_3$.

The electrochemical cells of the present invention may further comprise a separator interposed between the cathode and anode. Typically, the separator is a solid non-conductive or insulative material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous pseudo-boehmite layer, which may be provided either as a free standing film or by a direct coating application on one of the electrodes, as described in U.S. patent application Ser. Nos. 08/995,089, now U.S. Pat. Nos. 6,153,337, and 09/215,112, now U.S. Pat. No. 6,306,545, by Carlson et al. of the common assignee. Solid electrolytes and gel electrolytes may also function as a separator in addition to their electrolyte function.

In one embodiment, the solid porous separator is a porous polyolefin separator. In one embodiment, the solid porous separator comprises a microporous pseudo-boehmite layer.

Cells and batteries of the present invention may be made in primary and secondary types and in a variety of sizes and configurations which are known to those skilled in the art. These battery design configurations include, but are not limited to, planar, prismatic, jelly roll, w-fold, stacked, and the like. Although the methods of the present invention are particularly suitable for use with thin film electrodes, they may nevertheless be beneficial in thick film designs.

It is generally accepted that, when low electric currents are desired, the electrodes within the cell should have as much mass and as little surface area as possible. At the expense of power density, this provides for increased energy density while low electrode surface area minimizes undesirable self-discharge reactions. Conversely, when larger electrical discharge currents are required, electrode surface area and power density are maximized at the expense of energy density and self-discharge rate. Thin film electrodes provide high surface area and thereby high power density. Thin film electrodes may be incorporated into a number of battery design configurations, such as prismatic, jelly roll, w-fold and stacked configurations. Alternatively, designs incorporating both low and high surface area regions, as described in U.S. Pat. Nos. 5,935,724 and 5,935,728 to Spillman et al., may be incorporated into jelly roll and other configurations.

Thin film electrodes, in particular, may be configured into prismatic designs. With the drive to conserve weight, thin film barrier materials are particularly preferred, e.g., foils. For example, PCT Publication No. WO 00/36678 (International Appl. NO. PCT/US99/30133) to Thibault et al. describes methods for preparing prismatic cells in which suitable barrier materials for sealed casings, methods of filling cells with electrolyte, and methods of sealing the casing, are described.

EXAMPLES

Several embodiments of the present invention are described in the following examples, which are offered by way of illustration and not by way of limitation.

Example 1

Bis(methoxymethyl)polysulfide. A solution of sodium polysulfide was prepared from $Na_5S.9H_2O$ (12 g) and sulfur (1.6 g) in a solvent mixture of water (20 mL) and ethanol (10 mL). To 16 mL of the sodium polysulfide solution was added chloromethyl methyl ether (3.9 g) slowly with stirring at 25–27° C. Filtration of the solid (NaCl) and extraction with ether led to the isolation of the bis(methoxymethyl)polysulfide (2.6 g) as a viscous oil. The bis(methoxymethyl)polysulfide was determined by $H^1$ nmr to be a mixture of bis(methoxymethyl)mono-, di-, and trisulfides. Analysis of the oil gave the following results: C, 31.0%; H, 5.20%; S, 45.08%. Calculated for $C_4H_{10}O_2S_2$: C, 31.16%; H, 6.49%; S, 41.56%.

Example 2

Bis(methoxyethyl)disulfide. To 8 mL of the sodium polysulfide solution of Example 1 was added 1-bromo-2-methoxy ethane (3.7 g) with stirring at 22–25° C. Extraction of the reaction mixture with ether, washing of the ethereal solution with water, and concentration gave an oil. Distillation of the oil yielded 1.0 g of bis(methoxyethyl)disulfide. Analysis of the oil gave the following results: C, 38.27%; H, 7.82%; S, 36.18%. Calculated for $C_6H_{14}O_2S_2$: C, 39.56%; H, 7.69%; S, 35.16%.

Example 3

Bis(3-allyloxy-2-hydroxypropyl)trisulfide. A solution of sodium polysulfide was prepared from $Na_5S.9H_2O$ (48 g) and sulfur (25.6 g) in a solvent mixture of water (40 mL) and ethanol (8 mL). This solution was added to allyl glycidyl ether (76 g) in ethanol (40 mL) containing $NaHCO_3$ (40 g) in portions during 1.5 hours at 27–35° C. Evaporation of the ethanol was followed by extraction with ether. After drying the ethereal solution was concentrated to yield bis(3-allyloxy-2-hydroxypropyl)trisulfide (89.3 g). Analysis of the oil gave the following results: C, 44.3%; H, 5.02%; S, 28.9%. Calculated for $C_{12}H_{22}O_4S_3$: C, 44.16%; H, 6.80%; S, 29.42%.

Example 4

Bis(vinyloxyethoxy-2-hydroxypropyl)polysulfide. A solution of sodium polysulfide was prepared from $Na_5S.9H_2O$ (54.8 g) and sulfur (21.9 g) in water. The polysulfide solution was added with stirring to a mixture of ethylene glycol vinyl glycidyl ether (82.3 g), triethyl benzylammonium chloride (5.7 g), and $NaHCO_3$ (82.3 g) during 3 hours at 20° C. After 24 hours, water (200 mL) was added and the aqueous mixture extracted with ether. Removal of the ether yielded bis(vinyloxyethoxy-2-hydroxypropyl)polysulfide (86.4 g). Analysis of the oil gave the following results: C, 43, 62%; H, 6.99%; S 24.10%. Calculated for $C_{14}H_{26}O_6S_3$: C, 43.50%; H, 6.78%; S, 24.89%.

Example 5

Bis(2-hydroxy-2-phenylethyl)polysulfide. To a mixture of phenyloxirane (10 g), ethanol (5 mL), and $NaHCO_3$ (5 g) was added 8 mL of the polysulfide solution of Example 3 during 1.5 hours at 20–25° C. Dilution with water and ether extraction yielded a yellow oil from which was distilled unreacted phenyloxirane (2.8 g). The residue (5 g) was bis(2-hydroxy-2-phenylethyl)polysulfide.

Example 6

A cathode slurry, with a solid content of 14% by weight, was prepared in a solvent mixture of 80% isopropanol, 12% water, 5% 1-methoxy-2-propanol and 3% dimethyl ethanolamine (by weight). The solid slurry components were elemental sulfur (available from Aldrich Chemical Company, Milwaukee, Wis.), 65% by weight; Printex XE-2 (a trade name for conductive carbon available from Degussa Corporation, Akron, Ohio), 15% by weight; graphite (available from Fluka/Sigma-Aldrich, Milwaukee, Wis.), 15% by weight; TA22-8 resin (a trade name for an ethyl acrylate-acrylic acid copolymer available from Dock Resins Corporation, Linden, N.J.), 4% by weight; and Ionac PFAZ-322 (a trade name for trimethylol propane tris [β-(N-2-methyl aziridinyl)propionate], available from Sybron Chemicals Inc., Birmingham, N.J.), 1% by weight. The slurry was coated by a slot die coater onto both sides of a 18 micron thick conductive carbon coated aluminum foil (Product No. 60303 available from Rexam Graphics, South Hadley, Mass.), as a current collector. The coating was dried in the ovens of a slot die coater. The resulting dry cathode active layer had a thickness of about 26 microns on each side of the current collector, with a loading of electroactive cathode material of about 1.1 $mg/cm^2$.

Cells were fabricated from the coated cathode. The anode was lithium foil of about 50 microns in thickness. The electrolyte was a 1.4 M solution of lithium bis(trifluoromethylsulfonyl)imide, (lithium imide, available from 3M Corporation, St. Paul, Minn.) in a 42:58 volume ratio mixture of 1,3-dioxolane and dimethoxyethane. The porous separator used was 16 micron E25 SETELA (a trademark for a polyolefin separator available from Mobil Chemical Company, Films Division, Pittsford, N.Y.). The above components were combined into a layered structure of cathode/separator/anode, which was wound, soaked in the liquid electrolyte, and inserted in vials, to form vial cells with an electrode area of about 20 $cm^2$. The cells were charged and discharged at 0.25 $mA/cm^2$ from 1.25 to 2.80 volts.

Example 7

Vial cells were prepared by the method of Example 6 except that 1 volume % (0.8 weight %) of the polysulfide of Example 1 was added to the electrolyte prior to soaking. Charge and discharge of the cells was performed by the method of Example 6.

Example 8

Vial cells were prepared by the method of Example 6 except that 1 volume % (0.81 weight %) of the disulfide of Example 2 was added to the electrolyte prior to soaking. Charge and discharge of the cells was performed by the method of Example 6.

Example 9

Vial cells were prepared by the method of Example 6 except that 1 volume % (0.98 weight %) of the trisulfide of Example 3 was added to the electrolyte prior to soaking. Charge and discharge of the cells was performed by the method of Example 6.

Example 10

Vial cells were prepared by the method of Example 6 except that 5 volume % (4.9 weight %) of the trisulfide of Example 3 was added to the electrolyte prior to soaking. Charge and discharge of the cells was performed by the method of Example 6.

Example 11

Vial cells were prepared by the method of Example 6 except that 3 volume % (3.2 weight %) of the polysulfide of Example 4 was added to the electrolyte prior to soaking. Charge and discharge of the cells was performed by the method of Example 6.

Example 12

Vial cells were prepared by the method of Example 6 except that 10 volume % (10.1 weight %) of the polysulfide of Example 4 was added to the electrolyte prior to soaking. Charge and discharge of the cells was performed by the method of Example 6.

Example 13

Vial cells were prepared by the method of Example 6 except that 1 volume % (1.0 weight %) of the polysulfide of Example 5 was added to the electrolyte prior to soaking. Charge and discharge of the cells was performed by the method of Example 6.

Example 14

Vial cells were prepared by the method of Example 6 except that 1 volume % (0.89 weight %) of chloromethyl methyl ether ($CH_3OCH_2Cl$) was added to the electrolyte prior to soaking. Charge and discharge of the cells was performed by the method of Example 6.

The specific discharge capacity of the cells of Example 6, a comparative example, and the specific discharge capacities of the cells with capacity-enhancing electrolyte additives of this invention, Examples 7–14, are shown in Table 1.

TABLE 1

Specific Capacity vs. Electrolyte Additive

| Example | Additive Volume % | Specific Capacity (mAh/g) | | | Cumulative Specific Capacity (mAh/g) | |
|---|---|---|---|---|---|---|
| | | Cycle 1 | Cycle 10 | Cycle 30 | 30 cycles | % Increase |
| Example 6 | 0 | 1084 | 672 | 581 | 20009 | — |
| Example 8 | 1 | 1080 | 561 | — | — | — |
| Example 9 | 1 | 1238 | 760 | 624 | 22109 | 11 |
| Example 10 | 5 | 1238 | 927 | 773 | 26888 | 34 |
| Example 11 | 3 | 1238 | 827 | 665 | 23639 | 18 |
| Example 12 | 10 | 1298 | 819 | — | — | — |
| Example 13 | 1 | 1205 | 718 | — | — | — |
| Example 7 | 1 | 1233 | 678 | 543 | 20538 | 3 |
| Example 14 | 1 | 1184 | 785 | 593 | 22212 | 11 |

Example 15

Cells were prepared by the procedure of Example 6, except that the layered structure of cathode/separator/anode was wound and compressed with the liquid electrolyte filling the separator and cathode to form prismatic cells with an electrode area of about 840 $cm^2$. Discharge-charge cycling of these cells was done at 0.42/0.24 $mA/cm^2$, respectively, with discharge cutoff at a voltage of 1.5V and charge cutoff at 2.8V with 110% overcharge.

Example 16

An electrolyte was prepared by dissolving 2-(diethylamino)ethanethiol hydrochloride (0.86 g) in the lithium imide electrolyte of Example 6 (48 g), placing lithium foil (0.15 g) in the solution, and allowing hydrogen gas to be evolved during 4 days. After filtration, the resulting electrolyte was a lithium imide solution containing 1.4% by weight of the lithium salt of 2-(diethylamino)ethane thiolate. Prismatic cells were prepared by the procedure of Example 15 except that the lithium 2-(diethylamino)ethanethiolate containing electrolyte solution above replaced the lithium imide electrolyte of Example 15. Discharge-charge cycling was performed by the method of Example 15.

Table 2 shows the discharge capacity vs. cycle number for prismatic cells of Example 15 (no capacity-enhancing additive) and Example 16 with a capacity-enhancing additive of this invention.

TABLE 2

Discharge Capacity vs. Cycle Number

| Example | Additive Weight % | Discharge Capacity mAh | | |
|---|---|---|---|---|
| | | 20 Cycles | 40 Cycles | 60 Cycles |
| Example 15 | 0 | 612 | 600 | 543 |
| Example 16 | 1.4 | 638 | 638 | 620 |

Example 17

Cyclic voltammetry, using as electrolyte 1.4 M lithium bis(trifluoromethylsulfonyl) imide in a mixture of dimethoxyethane and dioxolane at a scan rate of 10 mV/sec with a nickel electrode, showed enhanced redox activity of 2-(diethylamino)ethanethiol in presence of $Li_2S_2$ showing that the 2-(diethylamino)ethanethiol increased the solubility of the $Li_2S_2$.

While the invention has been described in detail and with reference to specific embodiments thereof, it will be apparent to one skilled in the art that various changes and modifications can be made without departing from the spirit and scope thereof.

What is claimed is:

1. An electrochemical cell comprising:
   (a) a solid lithium anode;
   (b) a solid cathode comprising an electroactive sulfur-containing material; and
   (c) a non-aqueous electrolyte interposed between the anode and the cathode wherein the electrolyte comprises:
      (i) one or more lithium salts;
      (ii) one or more non-aqueous solvents; and
      (iii) one or more capacity-enhancing reactive components;
   wherein said capacity-enhancing reactive components comprise an electron transfer mediator selected from the group consisting of the mediator of the formula:

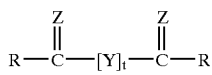

and the mediator of the formula:

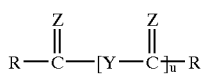

wherein:

Z is the same or different at each occurrence and is selected from the group consisting of O, S, Se, and $NR^5$, where $R^5$ is alkyl, aryl, or substituted derivatives thereof;

R is the same or different at each occurrence and is selected from the group consisting of alkyl, aryl, F, Cl, $CF_3$, $CF_3SO_2$, and $N(R^6)_2$, where $R^6$ is alkyl, aryl, or substituted derivatives thereof;

Y is —C=C— or

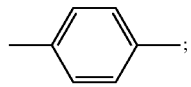

t is an integer from 0 to 4; and
u is an integer from 1 to 6.

2. The cell of claim 1, wherein said electron transfer mediator is present in the amount of 0.2% to 25% by weight of said electrolyte.

3. The cell of claim 1, wherein said electron transfer mediator has an oxidation-reduction potential less than 2.2 V.

4. The cell of claim 1, wherein said electron transfer mediator has an oxidation-reduction potential in the range of 1.5 V to about 2.0 V.

5. The cell of claim 1, wherein said one or more capacity-enhancing reactive components increase the discharge capacity of the first charge-discharge cycle of the cell by greater than 10%.

6. The cell of claim 1, wherein said one or more capacity-enhancing reactive components increase the total discharge capacities of 30 charge-discharge cycles of the cell by greater than 10%.

7. The cell of claim 1, wherein said one or more capacity-enhancing reactive components increase the total discharge capacities of 30 charge-discharge cycles of the cell by greater than 30%.

8. The cell of claim 1, wherein said one or more non-aqueous solvents are selected from the group consisting of ethers, cyclic ethers, polyethers, dioxolanes, sulfones, and sulfolanes.

9. The cell of claim 1, wherein said one or more lithium salts are selected from the group consisting of LiBr, LiI, LiSCN, $LiBF_4$, $LiPF_6$, $LiAsF_6$, $LiSO_3CF_3$, $LiN(SO_2CF_3)_2$, $LiC(SO_2CF_3)_3$, $(LiS_x)_zR$, and $Li_2S_x$, where x is an integer from 1 to 20, z is an integer from 1 to 3, and R is an organic group.

10. The cell of claim 1, wherein said electroactive sulfur-containing material comprises elemental sulfur.

11. The cell of claim 1, wherein the electroactive sulfur-containing material comprises greater than 75% by weight of sulfur.

12. The cell of claim 1, wherein the lithium anode is selected from the group consisting of lithium metal, lithium-aluminum alloys, lithium-tin alloys, lithium-intercalated carbons, and lithium-intercalated graphites.

13. The cell of claim 1, wherein the cell has an energy density greater than 1000 Wh/Kg.

14. The cell of claim 1, wherein the cell is a secondary electrochemical cell.

15. The cell of claim 1, wherein the cell is a primary electrochemical cell.

16. A method of making an electrochemical cell comprising the steps of:
   (a) providing a solid lithium anode;
   (b) providing a solid cathode comprising an electroactive sulfur-containing material; and
   (c) interposing a non-aqueous electrolyte between the anode and the cathode, wherein the electrolyte comprises:
      (i) one or more lithium salts;
      (ii) one or more non-aqueous solvents; and
      (iii) one or more capacity-enhancing reactive components;

wherein the capacity-enhancing reactive components comprise an electron transfer mediator selected from the group consisting of the mediator of the formula:

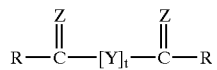

and the mediator of the formula:

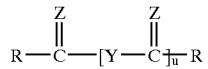

wherein:

Z is the same or different at each occurrence and is selected from the group consisting of O, S, Se, and $NR^5$, where $R^5$ is alkyl, aryl, or substituted derivatives thereof;

R is the same or different at each occurrence and is selected from the group consisting of alkyl, aryl, F, Cl, $CF_3$, $CF_3SO_2$, and $N(R^6)_2$, where $R^6$ is alkyl, aryl, or substituted derivatives thereof;

Y is —C=C— or

t is an integer from 0 to 4; and u is an integer from 1 to 6.

* * * * *